US011069007B2

(12) United States Patent
Coolidge et al.

(10) Patent No.: US 11,069,007 B2
(45) Date of Patent: Jul. 20, 2021

(54) CROP MANAGEMENT METHOD AND SYSTEM

(71) Applicant: Decisive Farming Corp., Irricana (CA)

(72) Inventors: Michael Coolidge, Irricana (CA); Remi Schmaltz, Irricana (CA); Tasha Schmaltz, Irricana (CA); Garth Donald, Irricana (CA)

(73) Assignee: Decisive Farming Corp., Irricana (CA)

( * ) Notice: Subject to any disclaimer, the term of this patent is extended or adjusted under 35 U.S.C. 154(b) by 48 days.

(21) Appl. No.: 16/604,076

(22) PCT Filed: Apr. 10, 2018

(86) PCT No.: PCT/CA2018/050442
§ 371 (c)(1),
(2) Date: Oct. 9, 2019

(87) PCT Pub. No.: WO2018/187870
PCT Pub. Date: Oct. 18, 2018

(65) Prior Publication Data
US 2020/0160459 A1    May 21, 2020

Related U.S. Application Data

(60) Provisional application No. 62/483,864, filed on Apr. 10, 2017.

(51) Int. Cl.
*G06Q 50/02* (2012.01)
*A01B 79/00* (2006.01)
(Continued)

(52) U.S. Cl.
CPC ........... *G06Q 50/02* (2013.01); *A01B 79/005* (2013.01); *A01B 79/02* (2013.01); *A01C 21/005* (2013.01); *A01C 21/007* (2013.01)

(58) Field of Classification Search
CPC ...... G06Q 50/02; G06Q 50/00; A01B 79/005; A01B 79/02; A01B 79/00; A01C 21/005; A01C 21/007; A01C 21/00
See application file for complete search history.

(56) References Cited

U.S. PATENT DOCUMENTS

2016/0078570 A1    3/2016  Ethington et al.
2016/0308954 A1    10/2016 Wilbur et al.

OTHER PUBLICATIONS

Office Action issued in corresponding CA Application No. 3,065,955 dated Oct. 16, 2019 (6 pages).
(Continued)

*Primary Examiner* — Christopher J. Novosad
(74) *Attorney, Agent, or Firm* — Osha Bergman Watanabe & Burton LLP

(57) ABSTRACT

A computer-implemented cloud-based agricultural enterprise management system and methods. The system comprises a plurality of modular components for receiving and processing data pertaining to agricultural production of commodities by an agricultural producer and for centralizing and storing the received and/or processed data in a single cloud-based database. The producer can provide to one or more third-party suppliers and/or service providers, authorized but restricted access to selected components of their agricultural enterprise management system and cloud-based database so that together, the producer, suppliers and service providers can effectively and cost-efficiently plan and manage the delivery of products and services during a crop production cycle, and the sale of harvested agricultural commodities. Separate modular components may be utilized for inputs exemplified by agronomy data, crop production inputs data, and crop growth and performance tracking.

20 Claims, 8 Drawing Sheets

(51) Int. Cl.
*A01B 79/02* (2006.01)
*A01C 21/00* (2006.01)

(56) References Cited

OTHER PUBLICATIONS

Notice of Allowance issued in corresponding CA Application No. 3,065,955 dated Jun. 4, 2020 (1 page).
International Search Report issued in International Application No. PCT/CA2018/050442 dated Jul. 5, 2018 (4 pages).
Written Opinion issued in International Application No. PCT/CA2018/050442 dated Jul. 5, 2018 (5 pages).

CROP MANAGEMENT METHOD AND SYSTEM

CROSS-REFERENCE TO RELATED APPLICATIONS

This application claims the benefit of U.S. Provisional Patent Application Ser. No. 62/483,864, filed Apr. 10, 2017, the content of which is incorporated herein by reference in its entirety.

TECHNICAL FIELD

This disclosure relates to computer-implemented methods and systems for managing farm-related commercial transactions. More particularly, this disclosure relates to computer-implemented methods and systems for identifying, evaluating and optimizing options for crop selection, crop rotations, and selection of crop production inputs.

BACKGROUND

The size and scope of farming i.e. agricultural production enterprises have been increasing during the last two decades as the producers endeavored to increase productivity while maintaining or reducing their input costs and overhead costs. There is a large assortment of interactive web-based applications ("apps") now available for an agricultural producer to input their annual field-by-field production-related agronomic data for assimilation and correlation with the historical data for the fields, and then for assimilation of the correlated production data with related inputs and/or services data records pertaining to fertility and pest management to provide accurate historical data regarding annual and multi-year revenues and returns-on-investment generated by the different crops that were grown on those fields. The results of such data entries, processing, and reporting are commonly used by the producer to assess crop production options available for an up-coming growing season and to concurrently forecast revenues and profits for each of the crop options based on the historical crop performance of their fields.

Such applications generally used by agricultural producers for selection and assessment of their crop production options for a selected field, are generally based on a decision matrix that incorporates: (i) the producer's preferred crop rotation cycle for each field, (ii) the historical annual production data on that field for each crop option being considered, (iii) current commodity pricing and related futures forecasting for each crop option, (iv) projected input requirements and related costs for each crop option, (v) projections of crop yields correlated over a selected range of input quantities for selected input options for example, selected fertilizers and pesticides, and (vi) estimation of ranges of potential revenues and profits for each crop option related to the ranges of types and quantities of inputs selected for each crop options.

The current agricultural management apps are functionally "reactive" in their operation in that their calculated projections of yields, revenues, and performance efficiencies are based on mathematical processing of and correlations with historical data. Such apps make it possible for producers to monitor the current status of their current crop production cycle with regards to input costs, rates of plant growth and development, for the purpose of predicting yields and associated production costs. These types of apps can now be run on handheld devices such as tablets and smartphones as well as on portable and desktop computers.

Also available are a wide assortment of programs and apps for suppliers of ag-chemical products and services to support their supply planning for upcoming crop production season, for example estimation of the volumes of fertilizer products and pesticide products they need to bring into inventory in order to ensure adequate supplies to service their client base. It is now possible for an agricultural producer to integrate and synchronize one or more of their agronomic apps with a supplier's inventory apps to enable the producer and supplier to coordinate their planning activities and also, to negotiate set pricing for the supply of selected products and services.

Adding to the increasing complexity of managing an agricultural enterprise is the emerging trend of globalization of the commodity markets available for the agricultural producer to sell their harvested products into, and the rapid ripple effects that occur in the commodity markets in response to significant political or weather events and the immediate impacts on real or perceived supply/demand imbalances. Consequently, in addition to using multiple web-based apps to monitor and manage their crop production activities and inputs supplies, many agricultural producers are also using on a regular basis web-based apps for monitoring agricultural commodities markets and futures trading as tools to assist their agricultural production planning and for developing their commodity divesture strategies.

The net consequence of the deluge of prior-art web-based apps for inputting and monitoring data associated with agricultural production and commodities markets is that the prior-art web-based apps flood agricultural producers with overwhelming information directly or indirectly relating to their farming operations for them to monitor and track, which however, increases the burden to their decision making and actions.

SUMMARY

The present disclosure generally relates to a computer-implemented web-based system and related methods for management of a producer's agricultural enterprise. The system disclosed herein generally comprises a plurality of modular components for receiving and processing data pertaining to agricultural production of commodities by the producer and for centralizing and storing the received and/or processed data in a single cloud-based data management platform that is interactive with multiple cloud-based databases.

According to one embodiment, an example of a single cloud-based data management platform comprises: (i) a Software-as-a-Service (SaaS) platform for hosting a plurality of business software applications for solely for the access and use by a single agricultural producer, and (ii) a Platform-as-a-Service (PaaS) platform for enabling the producer to provide limited and restricted access to some of their databases hosted on their SaaS platform, to selected suppliers and service providers so that the suppliers and service providers can monitor on-farm inventories and equipment/facilities records for the purpose of producing for the producer's review and decisions proposals and quotes for the delivery of products and services.

The producer can authorize restricted and authenticated access to their cloud-based agricultural enterprise data management platform, to one or more service providers so that together, they can effectively and cost-efficiently plan and manage the delivery of products and services during a crop production cycle, and the sale and delivery of agricultural commodities produced during the crop production cycle. Separate modular components may be provided for inputs exemplified by agronomy data, crop production inputs data, crop growth and performance tracking, commodity market data, weather monitoring and forecasting, farm equipment maintenance scheduling and tracking, enterprise management components, among others.

The agricultural enterprise methods disclosed herein generally comprise a multiplex of computer-executable programs for aggregating, processing, summarizing, reporting, and storing: (i) the crop performance and yield data inputs received and generated during each crop production cycle, and (ii) data received and generated pertaining to crop inputs and services provided by selected third-party suppliers and service providers. Additionally, the agricultural enterprise management method has a dedicated computer-executable program that authenticates and provides access to selected third-party suppliers and/or service providers under a gateway-controlled user restriction protocol, to enable each supplier or service provider to access one or more modules for the purpose of preparation of proposals and quotes for their products or services for a crop production cycle, for consideration and acceptance or rejection by the agricultural producer. If the crop producer accepts a service provider's proposal and quote, a computer-executable program component of the agricultural enterprise management method will generate a work order that will be deliver electronically to the successful third-party supplier or service provider. For example, a work order generated by the agricultural enterprise methods disclosed herein may comprise a single step or alternatively, a series of multiple steps. If a work order has multiple steps, there may also be generated an automated notification in advance of the time for which execution of the step is scheduled. There may also be generated a workflow tracking program to enable real-time monitoring of delivery of the work order steps as they are in progress, and optionally, a tracking program for post-delivery analysis and summary of the delivery of each step in the work order.

Based on the generated work order, the agricultural enterprise methods disclosed herein may determine one or more actions to be taken for completing the work order, and assign the one or more actions to relevant users. Moreover, the agricultural enterprise methods disclosed herein may schedule the one or more actions and record the scheduled one or more actions into the calendars of the relevant users. The agricultural enterprise methods disclosed herein may further track the progress of the scheduled one or more actions for monitoring the progress of the work order.

According to another embodiment of the present disclosure, the present agricultural enterprise system and methods disclosed herein provide a screen display in the form of a dashboard wherein each of the data modules is displayed as an icon or alternatively a tab or alternatively a pictogram. According to one aspect, a high-level current status report from a selected data module may be called up by clicking on the pictogram associated with the data module. The current status report may be presented in the form of data associated with a time line, a bar chart, a pie chart, a bullet graph, a sparkline, and the like. According to one aspect, an agricultural producer's agricultural enterprise system is accessible by the producer and by their selected, authorized and authenticated third-party suppliers and producers, as a display on their networked mobile wireless telecommunication computing devices such as exemplified by smartphones, tablets, portable/laptop computers, or alternatively, with a desktop computer.

According to another embodiment of the present disclosure, the crop producer is able to call up a high level current status report for data in a selected module by clicking on the related pictogram. The producer can then drill down through the raw data, the processed data, the summarized data, the projected data stored in the module by repeatedly clicking on the module's pictogram. Alternatively, the producer may navigate through various levels of granularity (e.g., facility, crop type, field, soil zones, among others) by using a combination of a navigation menu and on-page controls such as tabs, pictograms, and the like. The crop enterprise methods disclosed herein may additionally comprise computer-implemented software for performance of push analytics to provide high-level graphic displays of current projections pertaining to crop yields, production costs, returns on investment, related to current crop growth performance and costs incurred data inputs and commodity markets current prices and commodity futures prices. The agricultural enterprise methods disclosed herein may additionally comprise computer-implemented software for performance of SWOT analyses (strength, weakness, opportunities, threats) pertaining to scheduling of product applications such as seeding, spraying, and the like, harvestability scheduling, potential crop yields, and commodity sale pricing that are based on current crop growth performance, production costs-incurred data inputs, commodity markets current prices, and commodity futures prices. The agricultural enterprise methods disclosed herein may additionally comprise computer-implemented software for providing screen alerts for the producer one day, two days, three days, four days, five days, six days, seven days, two weeks, three weeks, four weeks in advance of: (i) a crop management or a crop production event requiring an action by the producer, or (ii) a scheduled delivery of a product(s) and/or a service(s) by a third-party service supplier or provider. The screen alerts may be accompanied by a concurrent audio alert and/or an email notification and/or a push notification (such as a text message, an in-app notification, and/or the like) to a portable device.

According to another aspect, selected, authorized and authenticated third-party suppliers and service providers are able to access one or more of a producer's modules to which they have received restricted access for, by clicking on the related pictogram for a selected module to receive a high-level current status view of the products and/or services they have been contracted to provide to the crop producer for the current crop production cycle. A third-party supplier or service provider may be able to access more detailed current and/or historical data pertaining to their past deliveries and scheduled future deliveries. The agricultural enterprise methods disclosed herein may additionally comprise computer-implemented software for providing screen alerts for the third-party supplier or service provider one day, two days, three days, four days, five days, six days, seven days, two weeks, three weeks, four weeks, in advance of a scheduled delivery of a product(s) and/or a service(s). The screen alerts may be accompanied by a concurrent audio alert and/or an email notification and/or a push notification (such as a text message, an in-app notification, and/or the like) to a portable device.

Another embodiment of the present agricultural enterprise methods disclosed herein is the incorporation at least two separate sets of modeling algorithms that integrate and then correlate and further model the mathematical processing of each of the current and historical data sets for each of the modules comprising the agricultural enterprise system, to enable delivery to the producer's dashboard display enable realtime high-level push analytics updates on the current crop production status relative to global weather patterns, global commodity market fluctuations based on current supply and demand data, coupled with risk identification and analysis.

According to one aspect of this disclosure, there is provided a computerized method for regularly monitoring growth of a selected crop. The method comprises creating a first task; collecting and storing into one or more cloud-based databases one or more scouting observations of a first site, the one or more scouting observations comprising at least a crop growth and development assessment, a detection of a presence of a plant pest, a detection of a plant disease; a detection of a nutrient deficiency; automatically generating a scouting report based on the collected one or more scouting observations and associating the generated scouting report with the first task; presenting the generated scouting report to a user; receiving from the user input indicating at least one product for applying to the site and a rate of application of the at least one product; automatically calculating the total requirements of the at least one product based on a total size of a site set, said site set comprising at least the first site; automatically generating and storing into the one or more cloud-based databases one or more agronomic prescriptions for scheduling, delivery, and application of the at least one product in the site set and associating the generated one or more agronomic prescriptions with the first task, said one or more agronomic prescriptions comprising the rate of application of the at least one product and the calculated total requirements of the at least one product; receiving one or more first application events in accordance with the one or more agronomic prescriptions, the one or more first application events comprising application data, the application data comprising at least an area that the at least one product has been applied thereto and an actual rate that the at least one product has been applied; recording and associating with the first task the application data of the received one or more first application events; updating the first task based on the recorded application data; and determining completion of the first task based on a comparison between the one or more agronomic prescriptions and the recorded application data.

In some embodiments, the first site is a field, facility, or a production space of the field or facility.

In some embodiments, the site set further comprises at least one second site.

In some embodiments, the at least one product comprises at least one of a fertilizer product and a pesticide.

In some embodiments, the one or more agronomic prescriptions comprise one or more schedules for applying the at least one product in the site set.

In some embodiments, the application data further comprises dates of applications, application rates, and weather conditions.

In some embodiments, the computerized method further comprises recording a date of completion of the first task.

In some embodiments, the computerized method further comprises deleting the first task.

In some embodiments, said recording and associating with the first task the application data of the received one or more first application events comprising at least one of: recording the application data of the received one or more first application events in a mobile app of the user and associating the recorded application data with the first task; and recording the application data of the received one or more first application events in the one or more cloud-based databases and associating the recorded application data with the first task.

In some embodiments, the computerized method further comprises notifying the user the received one or more first application events.

In some embodiments, the computerized method further comprises notifying the user the completion of the first task.

In some embodiments, the computerized method further comprises receiving a second application event irrelevant to the one or more agronomic prescriptions; creating a second task; and recording the received second application event with the second task.

In some embodiments, the computerized method further comprises notifying the user the received second application event.

In some embodiments, the computerized method further comprises at least one of: estimating potential yields of the selected crop based on the generated scouting report; and assessing whether or not an agronomic prescription should be prepared in order to improve crop growth and development.

In some embodiments, the computerized method further comprises receiving user input indicating a plurality of agrichemicals and application rates thereof for the site set; automatically calculating total product requirements of each of the plurality of agrichemicals; and including the plurality of agrichemicals and the calculated total product requirements thereof into the one or more agronomic prescriptions.

According to one aspect of this disclosure, there is provided a computer system for regularly monitoring growth of a selected crop. The computer system comprises a memory; one or more cloud-based databases; a network or a communication connection; and a processing structure coupled to the memory, the one or more cloud-based databases, and the network or the communication connection. The processing structure, the memory, the one or more cloud-based databases, and the network or the communication connection form a single computerized platform. The processing structure is configured for: creating a first task; collecting and storing into one or more cloud-based databases one or more scouting observations of a first site, the one or more scouting observations comprising at least a crop growth and development assessment, a detection of a presence of a plant pest, a detection of a plant disease; a detection of a nutrient deficiency, automatically generating a scouting report based on the collected one or more scouting observations and associating the generated scouting report with the first task; presenting the generated scouting report to a user; receiving from the user input indicating at least one product for applying to the site and a rate of application of the at least one product; automatically calculating the total requirements of the at least one product based on a total size of a site set, said site set comprising at least the first site; automatically generating and storing into the one or more cloud-based databases one or more agronomic prescriptions for scheduling, delivery, and application of the at least one product in the site set and associating the generated one or more agronomic prescriptions with the first task, said one or more agronomic prescriptions comprising the rate of application of the at least one product and the calculated total requirements of the at least one product; receiving one or more first application events in accordance with the one or more agronomic prescriptions, the one or more first application events comprising application data, the application data comprising at least an area that the at least one product has been applied thereto and an actual rate that the at least one product has been applied; recording and associating with the first task the application data of the received one or more first application events; updating the first task based on the recorded application data; and determining completion of the first task based on a comparison between the one or more agronomic prescriptions and the recorded application data.

According to one aspect of this disclosure, there is provided a computer-readable storage device comprising computer-executable instructions for regularly monitoring growth of a selected crop, wherein the instructions, when loaded into a memory of a single computerized platform and executed, cause a processing structure to perform actions comprising creating a first task; collecting and storing into one or more cloud-based databases one or more scouting observations of a first site, the one or more scouting observations comprising at least a crop growth and development assessment, a detection of a presence of a plant pest, a detection of a plant disease; a detection of a nutrient deficiency; automatically generating a scouting report based on the collected one or more scouting observations and associating the generated scouting report with the first task; presenting the generated scouting report to a user; receiving from the user input indicating at least one product for applying to the site and a rate of application of the at least one product; automatically calculating the total requirements of the at least one product based on a total size of a site set, said site set comprising at least the first site; automatically generating and storing into the one or more cloud-based databases one or more agronomic prescriptions for scheduling, delivery, and application of the at least one product in the site set and associating the generated one or more agronomic prescriptions with the first task, said one or more agronomic prescriptions comprising the rate of application of the at least one product and the calculated total requirements of the at least one product; receiving one or more first application events in accordance with the one or more agronomic prescriptions, the one or more first application events comprising application data, the application data comprising at least an area that the at least one product has been applied thereto and an actual rate that the at least one product has been applied; recording and associating with the first task the application data of the received one or more first application events; updating the first task based on the recorded application data; and determining completion of the first task based on a comparison between the one or more agronomic prescriptions and the recorded application data.

BRIEF DESCRIPTION OF THE DRAWINGS

The present disclosure will be described in conjunction with reference to the following drawings in which.

DETAILED DESCRIPTION

Figure 1:
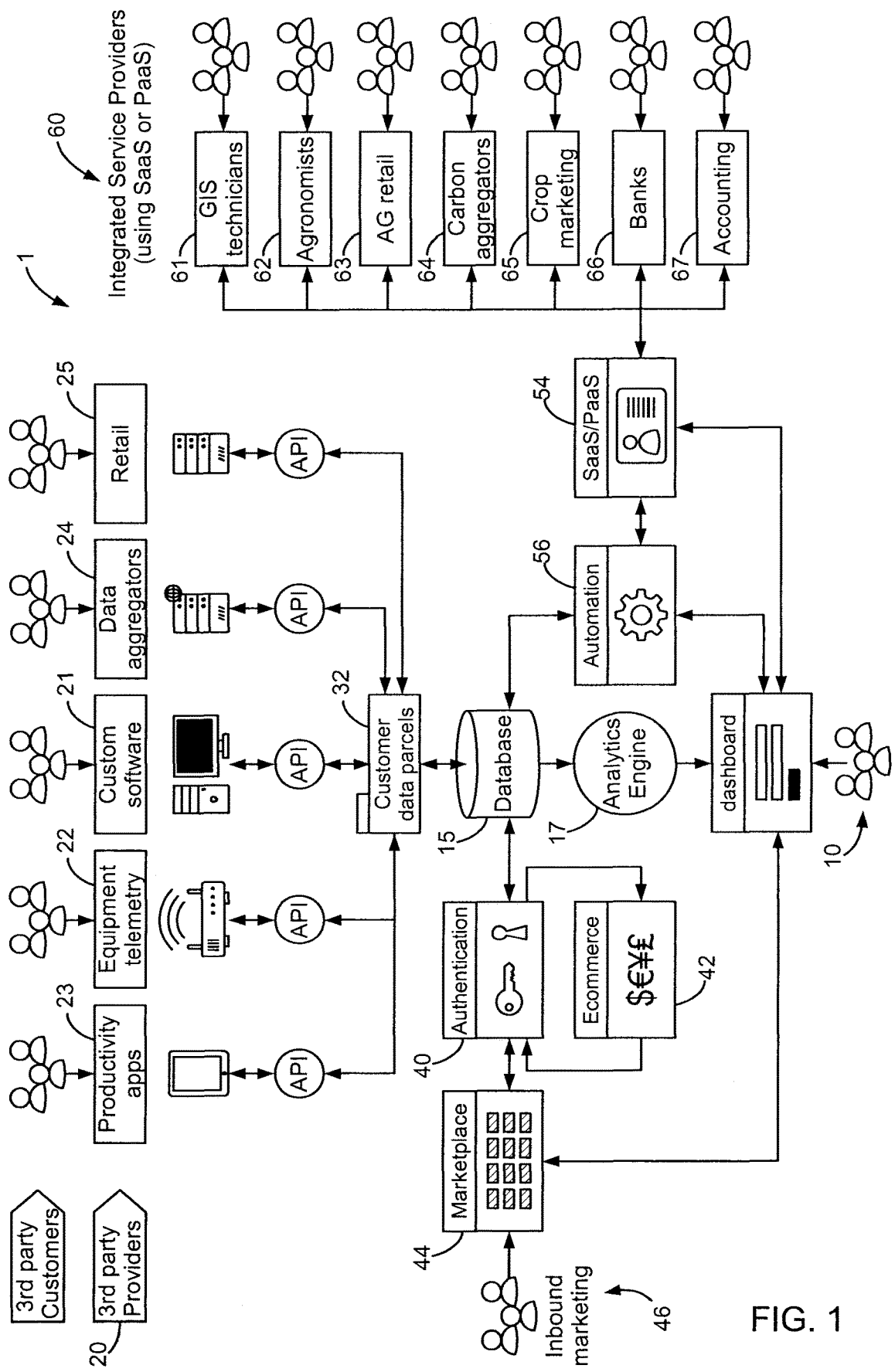
FIG. 1 is a diagrammatic illustration of one embodiment of a system and a method disclosed herein for capturing, processing, managing and outputting data relating to an agricultural enterprise, and for controlling access and use of the output data by third-party service providers.

The embodiments of the present disclosure generally relate to computer-implemented methods and a related system for agricultural enterprise management by an agricultural producer wherein all of annual data collected and/or generated, on a year-to-year basis, that pertain to the producer's: (i) crop production facilities' or farmlands' physicochemical and topographical characteristics, (ii) pre-sowing crop production planning and crop selection processes, (iii) actual crops produced on each of the individual fields comprising the farmlands, (iv) crop production inputs used to optimize a selected crop's growth, development, and productivity on each of the individual fields, (v) agronomy services engaged prior to and during the crop production cycle, (vi) crop yields harvested from each of the individual fields, (vii) sales and revenue-generated data for harvested crops, (viii) overhead expenditures incurred to produce each crop on each field and for managing the entire farmlands operation during a production cycle, (ix) financing of costs related to acquisition of the individual fields, acquisition of capital equipment, crop production costs, costs related to storage of harvested crops, delivery of harvested crops to purchasers, inventory records, and sales records relating to the harvested crops, (x) enterprise-related insurance costs, (xi) enterprise management overhead costs, (xii) production cost analyses and return-on-investment data, (xiii) lists of service providers, (xiv) weather data, (xv) commodity market performance relating to the grower's crops during the crop production cycle plus one cycle or two cycles or three cycles of monthly or annual commodity market performance specifically pertaining to the selected crops, are consolidated and centralized into a single database.

All of the data collected and/or processed and/or generated and/or summarized and/or reported during an annual crop production cycle for each of the afore-mentioned categories are referred to herein as an annual data set, while each of the individual data sets collected and/or processed and/or generated and/or summarized and/or reported for each of the afore-mentioned categories are referred to herein as a data subset. Previously collected and/or generated annualized historical data for a producer's agricultural enterprise can be inputted or imported into the agricultural enterprise management system disclosed herein for use in correlating and assessing costs, performance efficiencies, revenues, and returns-on-investment for each of the afore-mentioned categories, over selected periods of multiple crop production cycles.

The consolidated annual data and data subsets collected, generated, summarized, reported with the agricultural enterprise management computer-aided methods and stored in a database component of the related system disclosed herein, are accessible and easily searched or manipulated by the agricultural producer or a service provider using a networked mobile wireless telecommunication computing device exemplified by smartphones, tablets, portable laptop computers, or alternatively, a desktop computer. The annual data and data subsets input into the system or which are alternatively generated by the computer-implemented methods, are provided as a "dashboard display" on the producer's networked computing device wherein each of the aforementioned categories is displayed as an individual pictogram. Pictograms are commonly referred as computer icons. The agricultural enterprise management methods and system disclosed herein enable an agricultural producer to consolidate the inputting, processing, analyzing, summarizing and reporting all of the annual agronomic data, data pertaining to purchase and application of crop inputs products and services, crop production and yield data, commodity market performance relating to the grower's crops, crop inventory and sales data, and other key crop production data in a single application, to assist the grower in their annual crop planning, their management of the crop production activities, and sales of their harvested crops.

The agricultural producer may make available to selected third-party service providers and inputs providers on a restricted individual case-by-case basis using a gateway-controlled restriction protocol, access to one or of the data modules described herein. An authorized third-party service provider would have "read-only" access or alternatively, a mix of read-only access and read/write access to the crop production planning data module and additionally, to the historical data and data subsets in modules authorized by the producer, that directly relate to the services and/or products that they provide or alternatively wish to provide to the agricultural producer during the producer's crop production planning activities, managing their current crop production, storage, marketing and delivery of their harvested crops and/or other agricultural products. The authorized third-party service provider would then be able to provide the producer with a selection of options for the products and services that could be provided for the up-coming crop production season or cycle. If the producer chooses to proceed with one of the options proposed by the authorized third-party service provider, the methods and system disclosed herein will generate and save a related work order in the module and forward a copy of the work order to the authorized third-party service provider(s). A work order could list, for example, (i) a description of the product and/or service to be delivered, (ii) a date or alternatively, a list of dates for delivery of the product and/or service, (iii) pricing for the delivered product and/or service, (vi) online electronic payment options for selection and use by the producer, with payment verification, (v) completion confirmation section for confirming that the delivered product and/or service and the date(s) of delivery, (vi) comments section for entries by the producer and/or the authorized third-party service provider pertaining to the product and/or service and their delivery. A work order may optionally include a selection of predefined steps for inclusion of the delivery of services, and the formation of automated workflow patterns whereby a customizable workflow map may be created around the steps a service provider selects for inclusion for a selected producer.

In some embodiments, the methods and system disclosed herein may determine one or more actions to be taken based on the generated work order, and assign the one or more actions to relevant users including the authorized third-party service provider(s). Moreover, the methods and system disclosed herein may schedule the one or more actions and record the scheduled one or more actions into the calendars of the relevant users. The methods and system disclosed herein may further track the progress of the scheduled one or more actions for monitoring the progress of the work order.

Unless defined otherwise, all technical and scientific terms used herein have the same meaning as commonly understood by one of ordinary skill in the art to which the invention belongs. Certain terms are discussed in the specification to provide additional guidance to the practitioner in describing the methods, uses and the like of embodiments of the invention, and how to make or use them. It will be appreciated that the same thing may be said in more than one way. Consequently, alternative language and synonyms may be used for any one or more of the terms discussed herein. No significance is to be placed upon whether or not a term is elaborated or discussed herein. Recital of one or a few synonyms or equivalents does not exclude use of other synonyms or equivalents, unless it is explicitly stated. Use of examples in the specification, including examples of terms, is for illustrative purposes only and does not limit the scope and meaning of the embodiments of the invention herein. To facilitate understanding of the disclosure, the following definitions are provided.

As used herein, the term "ag retailer" means any retail organization that supplies producers with: (i) products such as seed, nutrients, agrichemicals, crop protection products, feed, equipment and technology, and (ii) services such as seed, nutrients, crop protection products, feed, equipment and technology.

As used herein, the terms "ag-chemical" and "agrichemicals" mean any of chemical fertilizer products, hormones, growth agents, insecticides, herbicides, fungicides, nematicides, and the like.

As used herein, the term "agronomic prescription" means a mapping of variable-rate fertilizer application to an individual field based on soil testing results and the fertility requirements for a selected crop to be grown on the field. An agronomic prescription may additionally include agronomic prescriptions for types and timing of pesticide applications to be made during the crop production cycle.

As used herein, the term "Agronomy Calculator" means an embodiment of the present disclosure that pertains to a method and system for determining variable-rate fertilizer requirements for fields comprised of one or more management zones.

As used herein, the term "agronomy services" means services provided by an unrelated third-party service provider to the agricultural producer, pertaining to technical data and/or advice regarding an individual field and or the farmlands regarding the physicochemical condition of the individual field(s), and/or to crop production options for each of the individual fields and/or to crop development performance during a crop production cycle. Agronomy services may include one or more of and are exemplified by variable-rate fertilizer prescription maps, seed prescription maps, fungicide prescription maps, production zone management, benchmark soil sampling, in-season soil testing, fertility planning, nutrient management, manure management, multi-year crop rotation planning, herbicide rotation planning, crop variety planning and selections, seeding rate calculations and recommendations, GPS field mapping, crop scouting, plant tissue analyses, seed analyses, planting timing, weed management, insect management, disease management, irrigation management, swath timing, harvest timing, record keeping, yield targets and estimates, cost-of-production analyses, risk and tolerance analyses, and the like.

As used herein, the term "capital investment" means money used to purchase a fixed asset such as land, fixed-in-place machinery and/or equipment, rolling machinery and/or equipment, buildings, and the like.

As used herein, the term "costs of sales" means all of the direct costs incurred by the agricultural producer to produce and harvest a crop from an individual field during a crop production cycle. Direct costs may include the cost of seeds, starting plant material, juvenile livestock, juvenile poultry, crop production inputs exemplified by fertility products, feed, pesticides, labor hired for sowing, application of fertility and/or pesticide products, harvesting, fuel costs for equipment to work an individual field during a crop production cycle, agronomic service fees, and the like.

As used herein, the term "crop production" means all of the activities associated with planning, planting, growing, harvesting, and all related management activities for a crop selected for an individual field for a growing cycle. For most grain crops, fruit crops, berry crops, crop production occurs once on an annual basis. For biomass crops such as hay, alfalfa and the like, or alternatively, crops produced in greenhouses or in controlled-environment facilities wherein the crops such as annual plants, perennial plants, medicinal herbaceous plants, angiosperm woody plants, gymnosperm woody plants, crop production may occur twice or three times or four times on an annual basis. Depending on the types of products delivered to market, dairy production, poultry production and the like may occur on a daily basis, a weekly basis, a monthly basis, a multi-monthly basis, an annual basis. Depending on the types of products delivered to the market, livestock production may occur on a monthly basis, a multi-monthly basis, an annual basis, or a multi-year basis.

As used herein, the term "dashboard display" means a single page web-based real-time user interface displaying on a mobile wireless telecommunication computing device and/or a desktop computer, a series of links or tabs or pictograms that are linked to the modular data input components described herein for showing graphical presentation of the current and historical data and data subsets residing within the modules that may be filtered and/or navigated using a content search field based on defined query string parameters. The user interface may be designed to display the data and data subsets in relation to geo-spatial maps and/or as colorful summaries and/or graphics exemplified by bar charts, pie charts, bullet graphs, sparklines and the like.

As used herein, the term "driver" means a selectable function specific to one of the selected nutrients, resulting in an automated calculation of fertilizer rates according to a predefined set of nutrient requirement rates for the selected crop type.

As used herein, the term "enterprise-related insurance" includes property insurance, crop insurance for risks exemplified by weather, hail, drought, frost damage, insects, disease, and the like, equipment insurance for risks exemplified by damage and/or liabilities resulting from accidents, mechanical failures, credit insurance for risks associated with sales of crops.

As used herein, the term "farmlands" means all of an agricultural producer's land and/or facilities such as greenhouses and/or closed buildings used for crop production exemplified by grain production and biomass production and/or livestock production and/or dairy production and/or poultry production and/or fruit production and/or berry production and/or grape production and/or greenhouse production and/or closed environmental production facilities of agricultural crops or horticultural crops or forestry crops or medicinal plant crops.

As used herein, the term "fertilizer rate" means a specified rate of a fertilizer product set to be applied to a specific management zone in the field. In various embodiments, the fertilizer product set may comprise straight fertilizer product(s) and/or blended fertilizer product(s).

As used herein, the term "straight fertilizer product" means any product, natural or manufactured, designed to deliver a specific amount of one or more nutrients to a plant.

As used herein, the term "blended fertilizer product" means a combination of straight fertilizer products, conventionally represented by a guaranteed analysis.

As used herein, the term "guaranteed analysis" means a ratio of nutrients delivered through a blend of multiple fertilizer products.

As used herein, the term "individual field" means one discreet plot of land with defined cultivated borders.

As used herein, the term "manual" means a selectable function specific to one of the nutrients, resulting in a manual entry or adjustment of fertilizer rates.

As used herein, the term "nutrient requirements" means a set of calculated values of actual nutrient required to achieve a specific yield. Nutrient requirements as discussed herein are based on: (i) available soil testing data for a specific zone in a field as delineated by a geospatial fertility map, or (ii) agronomic nutrient requirements for the crop being grown, or (iii) a predefined yield goal for a selected zone.

As used herein, the term "overhead costs" means all costs related to the ongoing costs associated with operating and managing the agricultural enterprise. Overhead costs may include land rental fees, debt service fees, line-of-credit fees, electricity, heating, other utilities, fuel, building maintenance and repairs, equipment maintenance and repairs, insurance, taxes, financial services such as book-keeping fees, accounting fees, and the like, legal services, travel, telecommunications equipment and fees, and other types of miscellaneous costs that are not directly attributable to the cost of producing a product during a crop production cycle.

As used herein, the term "PaaS" means a "platform as an enterprise service" a computing platform, typically including operating system, programming language execution environment, database, and web server for use by service providers for integrating their software with the agricultural producer's SaaS platform without the cost and complexity to the agricultural producer of having to buy and manage the suppliers' underlying hardware and software layers.

As used herein, the term "physicochemical characteristics" means the physical properties and characteristics in combination with the chemical composition of the top layers of soil within an individual field. The top layer of soil may have a depth of up to one meter from the soil surface.

As used herein, the term "products applied" means a listing of one or more prescribed ag-chemical products (fertilizers and/or pesticides) that were applied at specified rates of application at selected times on a selected field in accordance with an agronomic prescription or a task.

As used herein, the term "SaaS" means a "software as a service" delivery model for a plurality of business software applications exemplified by office and messaging software, database management system software, business management software, accounting software, collaboration software, customer relationship management, management information systems, enterprise resource planning, service desk management software, invoicing software, human resource management software, payroll processing software, and the like.

As used herein, the term "satellite imagery" means visual images recorded by devices carried in space by satellites above the earth's atmosphere, and includes high-resolution near-infrared imagery, far-infrared imagery, multispectral imagery, hyperspectral imagery, panchromatic imagery, light detection and ranging (LIDAR) imagery, digital elevation model (DEM) imagery, and the like. It is to be noted that the scope of the present disclosure encompasses high-resolution areal imagery captured by recording devices deployed within the earth's atmosphere, wherein the recording devices are carried by airplanes or drones.

As used herein, the term "scouting" means the process of regularly monitoring a selected field for the purpose of precisely detecting and assessing the occurrence of crop pests (i.e., diseases and insect infestations), and for selection and recommendation of suitable pest and disease control interventions. "Scouting" as used herein also includes the process of regularly monitoring a selected field for the purpose assessing crop growth and development for estimation of potential crop yields, and for assessment of whether or not an agronomic prescription should be prepared in order to improve crop growth and development.

As used herein, the term "Task Module" means a user interface (also referred to herein as "UI") that tracks and reports on the status of all tasks. The "Task Module" allows service providers (or producers) to complete the following actions for one or more selected tasks: (i) review scouting reports, (ii) create agronomic prescriptions, (iii) record related details including dates of applications, application rates, and weather conditions, and (iv) indicate task completion and date of completion, and (v) deletion of active and of completed tasks as appropriate.

As used herein, the term "service provider" means a third-party that is qualified to provide to agriculture producers, consultative services pertaining to one or more aspects of the agricultural enterprise such as crop scouting, soil testing, field mapping, custom planting, nutrient applications, pesticide applications, and development of nutrient management and conservation plans, financial advice or services, or crop marketing advice or trade execution services. Such services may be on a fee basis. Non-limiting examples of service providers include ag retailers, agronomic services providers, crop sowing contractors, fertilizer application service providers, pesticide application service providers, crop scouting service providers, harvesting service providers, crop hauling and delivery service providers, equipment dealerships, equipment maintenance and repair service providers, weather and weather forecasting services, financial services, accounting services, insurance services, telecommunications and internet services, commodity brokering services, and the like.

As used herein, the term "task" means a designated workflow pertaining to a specific selected field and which is initiated by one of: (i) the submission of a scouting report, (ii) the creation of an agronomic prescription for the selected field (without the prior submission of a scouting report), or (iii) a recording of "applied products" in situations wherein a scouting report is not available and an agronomic prescription for the selected field has not been created.

As used herein, the term "topographical" means the three-dimensional vertical and horizontal profile of an individual field and can be characterized by the changes in elevation and slope and orientation to the earth's magnetic field (i.e., north, south, east, west compass points).

An example of an agricultural enterprise management system disclosed herein generally comprises a single cloud-based data management platform that is interactive with multiple cloud-based databases, and is accessible with a variety of mobile wireless telecommunication computing devices exemplified by smartphones, tablets, portable laptop computers, smart watches, smart glasses, wearable devices, or alternatively, with desktop computers. The agricultural enterprise management system comprises a plurality of modules for inputting crop planning production data inputs for processing and analysis by the methods disclosed herein for the purposes of aiding in selection of a crop for production on a selected individual field from the farmlands, for generating an agronomic prescription for the individual field, for generating one or more related work orders for transmittal to one or more suppliers and/or service providers, for monitoring crop growth and development performance data during the crop production cycle, for performing SWOT analyses and risk assessments prior to and during the crop production cycle, for monitoring commodity market prices and use of such data for calculating revenue projections and return-on-investment forecasting.

In some embodiments, the agricultural enterprise management system disclosed herein may determine one or more actions to be taken based on the generated work order, and assign the one or more actions to relevant users such as one or more suppliers and/or service providers.

Moreover, the methods and system disclosed herein may schedule the one or more actions and record the scheduled one or more actions into the calendars of the relevant users. The methods and system disclosed herein may further track the progress of the scheduled one or more actions for monitoring the progress of the work order.

An agricultural enterprise management system according to the present disclosure may comprise data input modules pertaining to:

(i) agricultural production data collected on an individual latitude and longitude within a field for multiple cropping cycles including sowing, spraying, top dressing, irrigation, and harvesting dates, crop types sown, yield target, yield data, environmental data regarding temperatures, precipitation, moisture, wind, and sunlight hours throughout each cropping cycle;

(ii) multiple cropping cycle records pertaining to variable zone-based agronomic prescriptions for optimized production of selected crops in selected agricultural fields, based on correlations of selected satellite imagery with soil sample analyses, agronomic prescriptions, historical crop production records, and historical weather data;

(iii) ag-chemical input records and costs for each annual cropping cycle wherein the ag-chemicals are characterized by crop, chemical type, chemical manufacturer or blender, soil characteristics, major nutrients and minor nutrients;

(iv) an Agronomy Calculator comprising agronomic formulae for processing of soil physicochemical data and/or satellite imagery correlatable to the soil physicochemical properties of a selected farmland field or fields;

(v) work order entry and tracking module for an authorized service provider to generate a dedicated inventory of a product and/or a service for delivery to the producer, tracking of the delivery progress, and confirmation of delivery, and alternatively, for generating an order for an agronomic service or a technical service, delivery of the agronomic service or technical service, and a report summarizing the service delivered. Alternatively, the work order entry and tracking module may be used by the producer to initiate a work order that is then delivered to one or more selected producers; in some embodiments, one or more actions such as inventory preparation, products delivery, application of products in the selected farmland field or fields, and the like, are scheduled and assigned to one or more users for completion of the word order; the scheduled actions may be recorded into the calendars of the one or more users for generating reminders therefor and for tracking the progress of the work order;

(vi) inventory records and management for crops held on-farm, and optionally, electronic sensors for monitoring inventories of selected inputs and/or agricultural commodities produced and held in on-farm storage;

(vii) historical data pertaining to commodity demands, volumes delivered, and pricing;

(viii) real-time feeds of commodity market pricing on an hourly and/or daily and/or monthly basis correlated with valuation of the producer's market position and current outstanding contracts for margin tracking;

(ix) crop sales and return-on-investment (ROI) data on a cropping cycle basis;

(x) risk identification, assessment, and management modules for (a) crop production, and (b) commodity markets (supply and demand);

(xi) equipment inventory, maintenance and operations costs, and performance efficiency tracking;

(xii) User authentications authorizing access to third-party software, for the purpose of either automated or manually initiated transfer of data.

(xiii) a plurality of predictive modeling algorithms for performance of real-time "what if" analyses prior to and during a crop production cycle to facilitate production management decisions to respond to global weather events and/or economy fluctuations;

(xiv) a plurality of algorithms for assimilating outputs from the above components into dashboard summaries of "key performance indicators" (KPIs) that provide high-level snapshots of real-time crop production performance with "SWOT" (strength-weakness-opportunity-threat) analyses during a crop production cycle, to enable management decisions to modify crop management activities in order to optimize production outputs and revenues captured; and optionally (xv) a farm data and service marketplace module wherein the sale, exchange, collection and connection of all farm data sets are input into a single database or multiple inter-connected databases wherein the individual data sets can be combined with other relevant data sets exemplified by soil, annual weather, and market information data sets that are directly related to the producer's farmlands.

An embodiment of an agricultural enterprise management system 1 is shown in FIG. 1 and generally comprises a cloud-based database 15, a plurality of modules 20 for receiving certain specific types of data inputs wherein the data inputs are processed and summarized and consolidated in an outputs module 32. The processed data may be further analyzed by a number of computer-executable analytics programs 17 and the results displayed on a screen format 12 accessible by the agricultural producer 10, in the form of a dashboard with multiple pictograms related to the individual modules 21, 22, 23, 24, 25 comprising the plurality of modules 20. Access to the producer's 10 cloud-based database 15 and the outputs module 32 is available to third parties 46, 60 selected by and authorized by the producer 10 via a gateway-controlled restriction protocol and authentication portal 40. The producer 10 may make access available to some third parties 46 who may be potential clients for the producer's products, to the producer's marketplace module 44. The producer may make access available to their cloud-based database 15 and the outputs module 32 via a gateway-controlled restriction protocol and authentication portal 40 to some third parties 60 who may be suppliers of crop production inputs or alternatively service providers exemplified by GIS technicians 61, agronomists 62, retailers of agricultural input products 63, carbon aggregators 64, crop marketing representatives 65, financial institutions 66, accounting services 67, and the like. The agricultural enterprise management system 1 additionally comprises a computer-implemented component 56 for generating agronomic prescriptions and related work orders that are transmitted electronically to selected suppliers and/or service providers, and which are accessible by the selected suppliers and/or service providers via the gateway-controlled restriction protocol and authentication portal 40. Actions and schedules thereof may also be generated and transmitted electronically to selected suppliers and/or service providers, and which are accessible by the selected suppliers and/or service providers via the gateway-controlled restriction protocol and authentication portal 40. Additionally, the agricultural enterprise management system 1 additionally comprises a computer-implemented ecommerce component 42 for receiving payments from the producer's customers for the agricultural products they have purchased, and for making payment to the producer's suppliers for crop production inputs ordered by and delivered to the producer, and to the producers service providers for the services ordered by and delivered to the producer.

Figure 2:
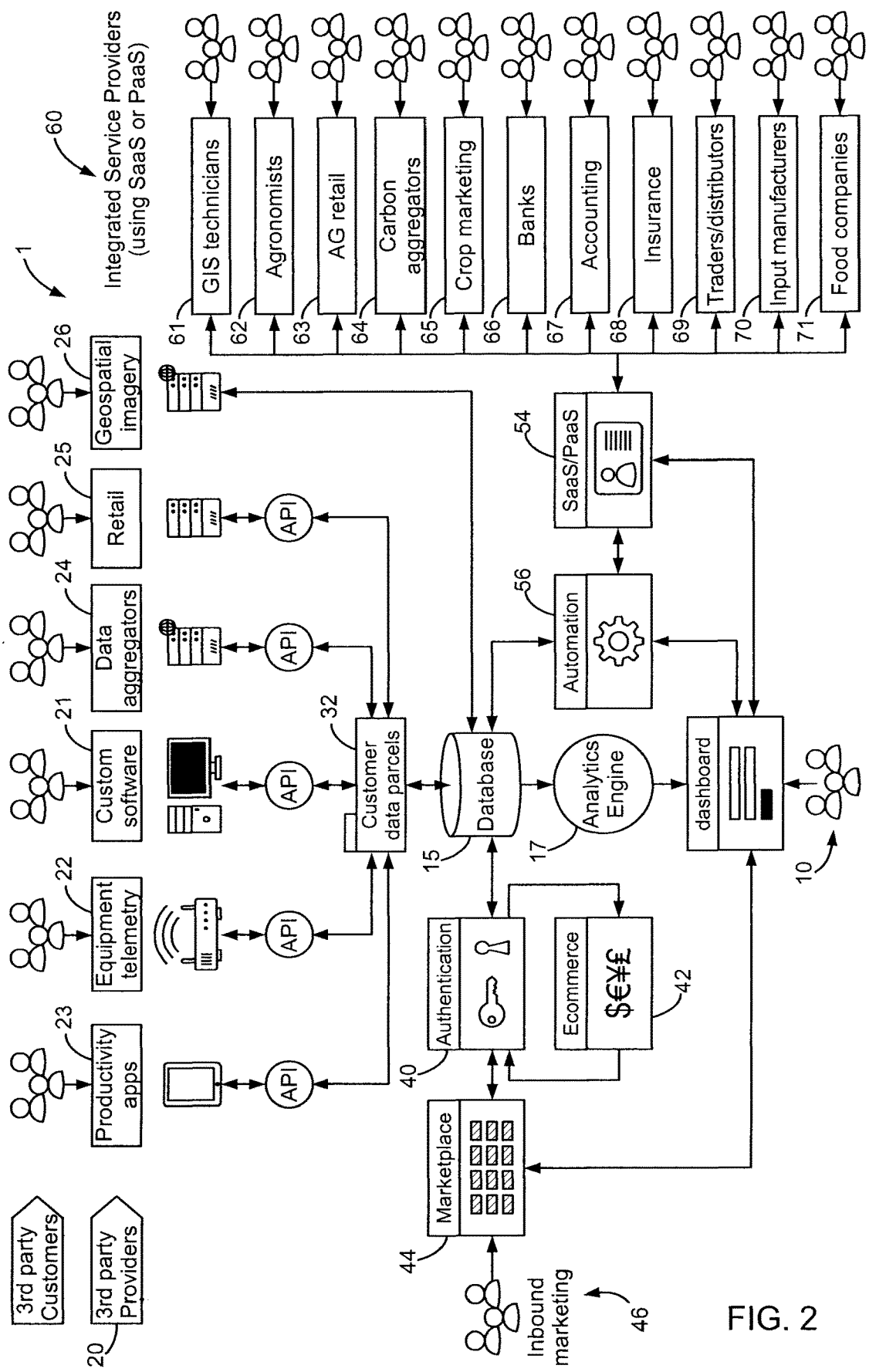
FIG. 2 is a diagrammatic illustration of another embodiment of a method disclosed herein for capturing, processing, managing and outputting data relating to an agricultural enterprise, and for controlling access and use of the output data by third-party service providers.
Figure 3:
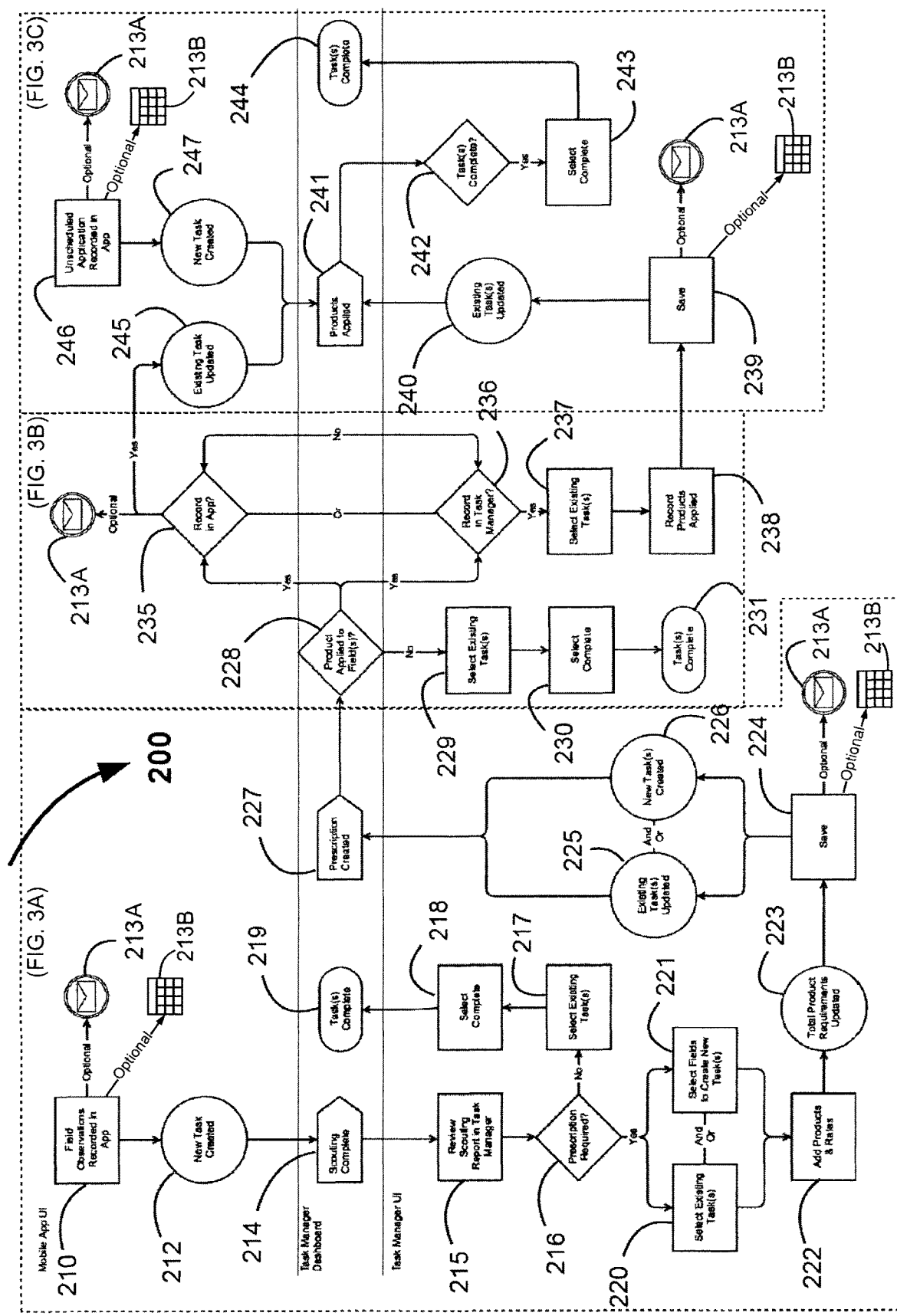
FIG. 3 is a diagrammatic illustration of an exemplary Task Module according to an embodiment of the present disclosure.
Figure 3A:
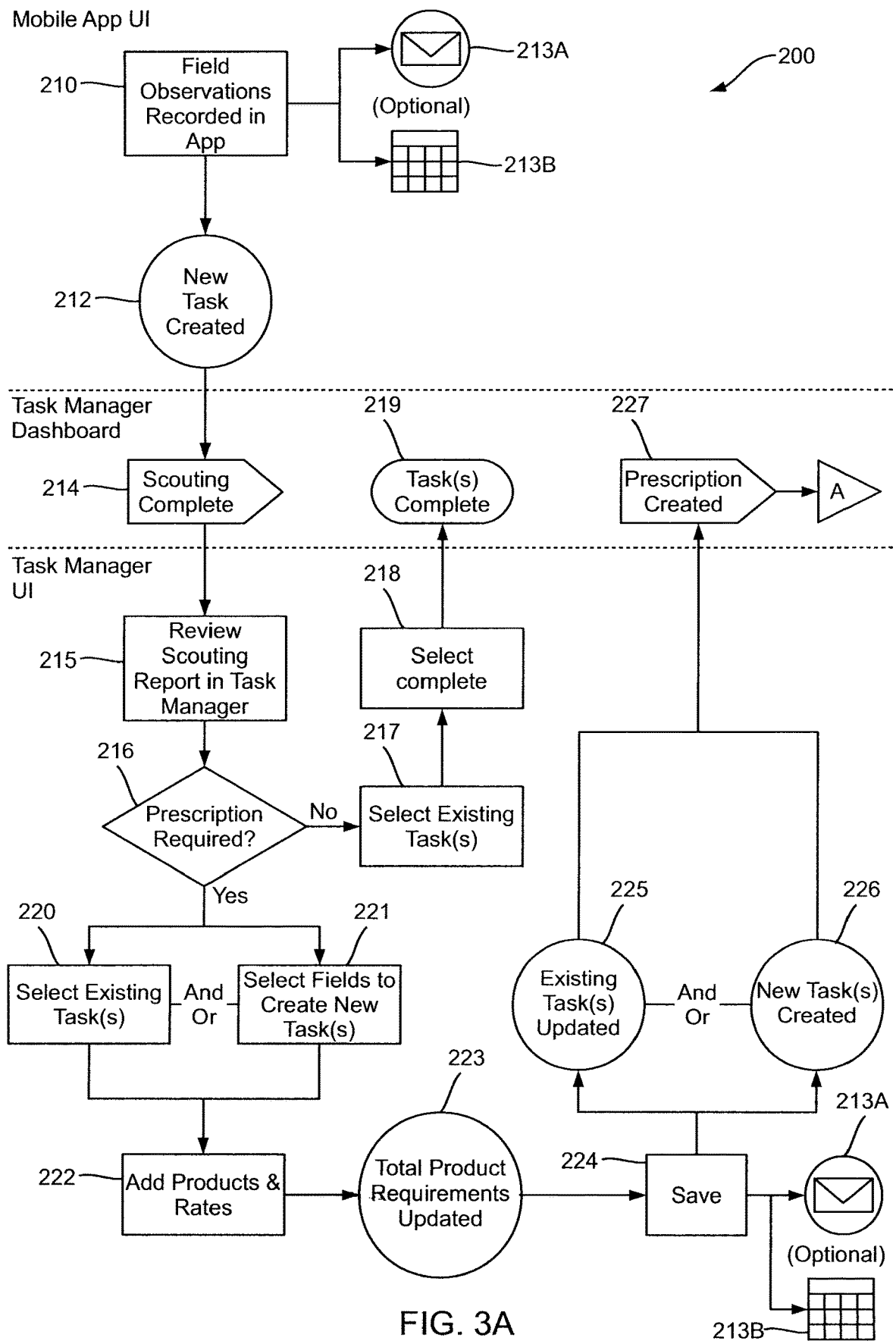
FIGS. 3A to 3C show enlarged portions of the exemplary Task Module shown in FIG. 3.
Figure 3B:
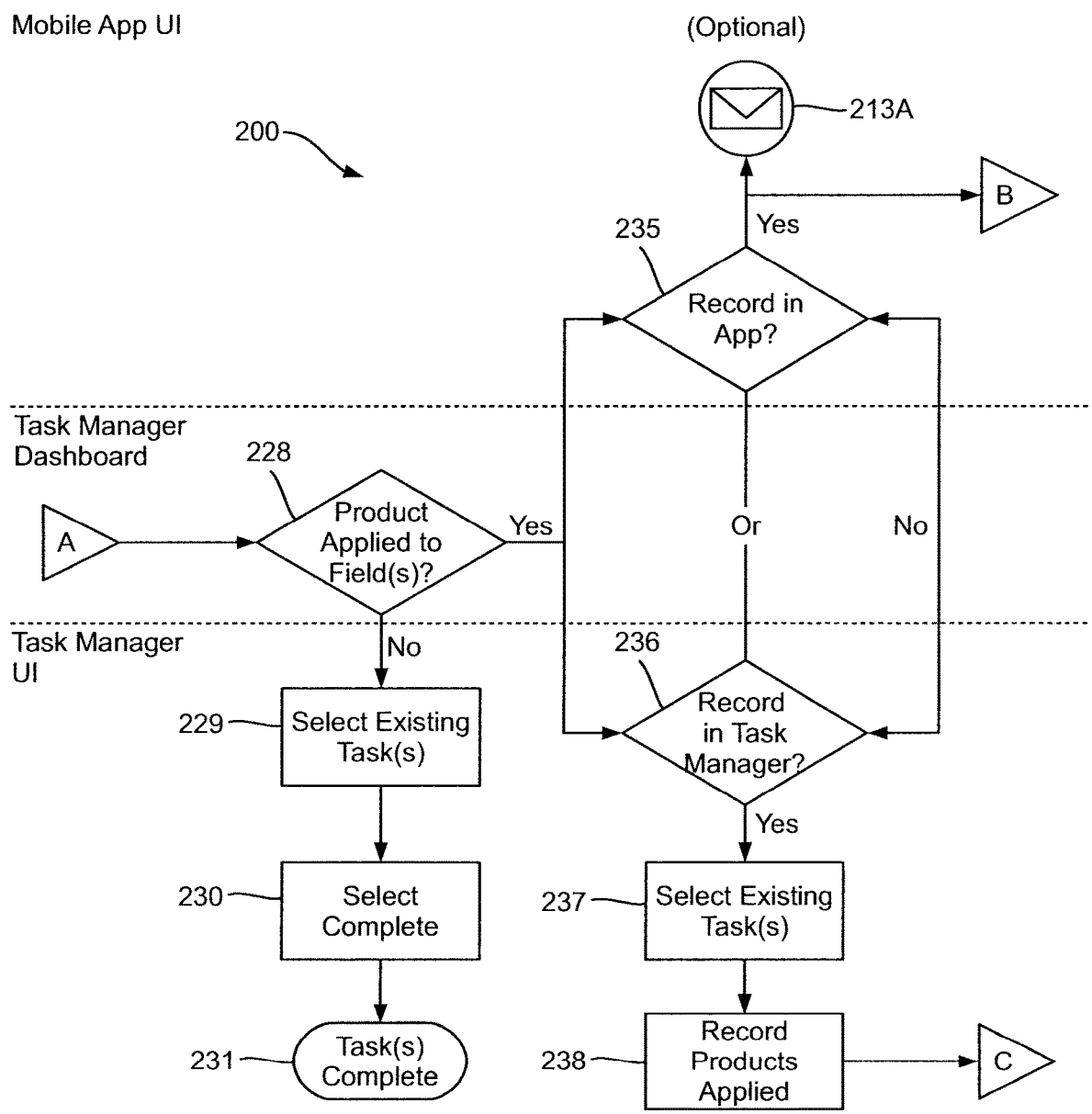
Figure 3C:
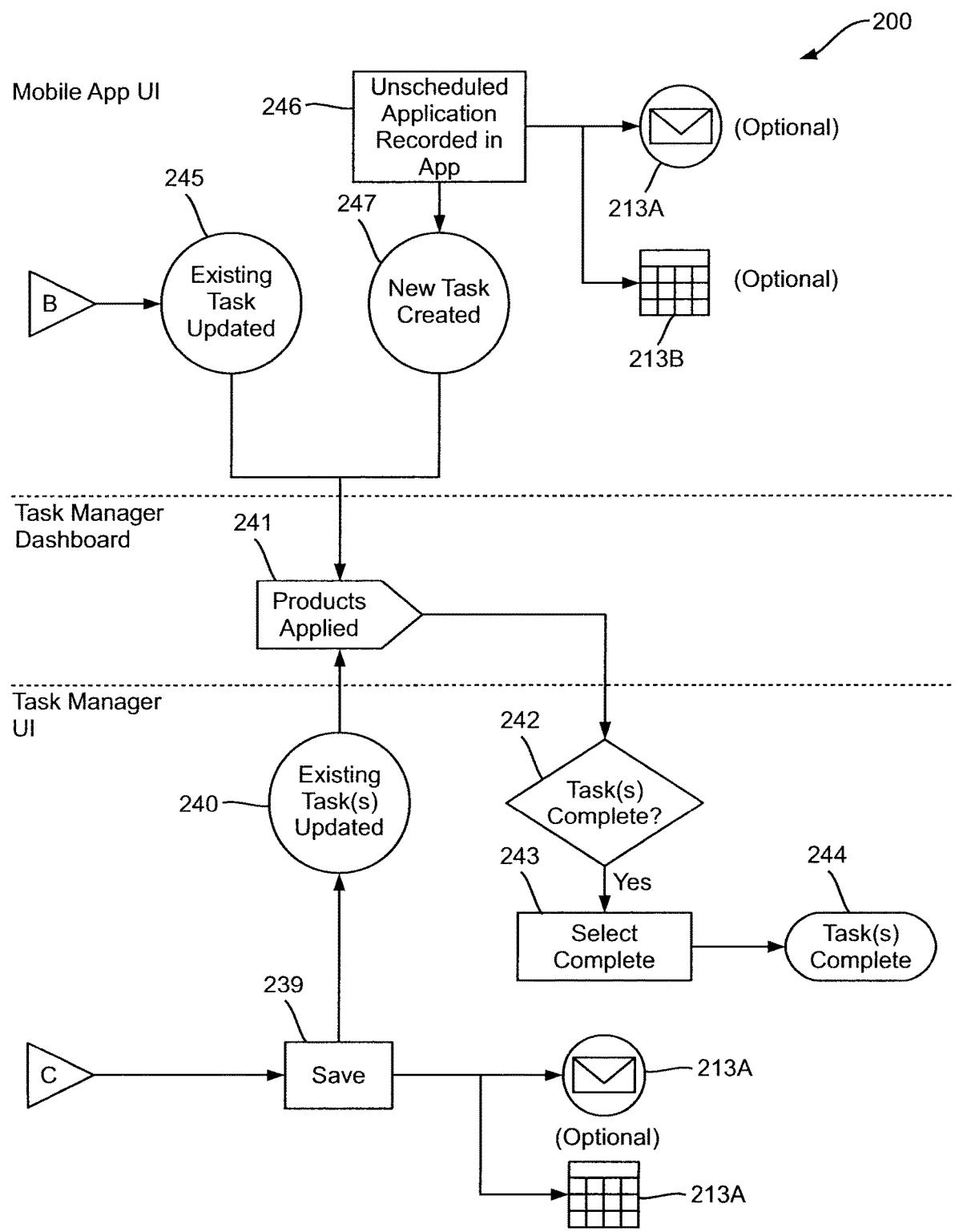

The agricultural enterprise management system 1 shown in FIG. 1 can be expanded by integration of additional data input modules, for example geospatial imagery 26 (FIG. 2) and/or by addition of more suppliers and service providers such as insurance agencies 68, wholesale distributors 69, manufacturing companies 70, food processors 71, and the like (FIG. 2).

In summary, the agricultural enterprise management system and methods disclosed herein aggregates in a single computer-implemented system, the many services used by an agricultural producer prior to and during a crop production cycle, and post-harvest marketing and delivery of the agricultural products to the producers' customers. The present system and methods provide the capability for consolidating, processing, analyzing, assessing, and summarizing a producer's current production data with their historical production data. The producer's crop production data and their crop-planning data can be made available to selected third-party suppliers and service providers via a gate-controlled, restricted and authorized basis to enable the suppliers and service providers to assess the producer's needs for crop input products and crop production services, and to provide cost/benefit analysis-based supply proposals and/or service proposals for the producer's consideration. The present agricultural enterprise management system and methods will then generate and provide agronomic prescriptions and work orders to selected suppliers and service providers, and additionally generate alerts, schedules for necessary actions, and the like, for the producer and the selected suppliers and service providers to ensure that the ordered products and services are timely delivered.

Another embodiment of the present disclosure generally relates to a method and system for managing crop health with a data management platform supporting automated processes and workflows for field scouting, for development of agronomic prescriptions, and for the scheduling and delivery of various types of product applications. This method and system is referred herein as a "Task Module".

Producers, agronomists and other service providers, and ag retailers require an effective means of managing the complete cycle of scouting fields, creating and receiving agronomic prescriptions, and confirming products applied (for various reasons, including: inventory management, compliance reporting, agronomic management). Current problems for the producer with scouting services available to them is that the use of non-standardized scouting methods, analysis, and reporting makes it difficult them to clearly detect, understand, and take steps to address the occurrence of a crop production anomaly in order to ensure that optimal crop yields are achievable. The use of digital technologies is becoming increasingly prevalent during scouting activities to improve the efficiency of early detection of the occurrences of diseases, insect pests, and nutrient deficiencies. However, adequate user management frameworks and automated workflow processes are not available for integration into crop production management systems and methods.

According to one aspect, the Task Module provides the ability for a user to prepare a single agronomic prescription for multiple fields and/or facilities requiring the same treatment for example an application of a fertilizer product and/or a pesticide and the like, which then results in the updating of multiple workflows associated with the field and/or facility and the task. This feature provides a significant reduction of the time required of an agronomist in the preparation of agronomic prescriptions.

According to one aspect, the Task Module comprises a software application (i.e., a series of process steps) for entry of scouting observations made for a selected site such as a selected field and/or facility at a specified time period, and concurrently enables viable interactions with one or more prescriptions prepared for the selected field and/or facility, and further concurrently enables the real-time recording of product applications to and within the selected field and/or facility.

According to another aspect, the Task Module may be incorporated into the present agricultural enterprise management system as exemplified in FIGS. 1 and 2 for restricted access by users with permissions, for example, producers, service providers such as agronomists and crop scouts, and ag retailers, to: (i) monitor the status of existing workflows for one or more selected fields and/or facilities, wherein the workflows relate to scouting reports, agronomic prescriptions, fertilizer products applied, pesticide products applied and the like, (ii) prepare agronomic prescriptions for one or more selected fields independent of or alternatively, based on existing scouting reports, (iii) input records of fertilizer products and pesticides applied independent of or alternatively, based on existing agronomic prescriptions, and (iv) input completion of task workflows.

According to another aspect, the Task Module enables a user to commence or terminate a workflow for a selected field to begin at any point in the above-mentioned stages (i) to (iv), and for the workflow to be tracked as a unique task for a selected field and/or facility.

According to another aspect, the Task Module additionally comprises a standard process, referred to herein as a "prescription calculator" to enable a user to specify multiple agrichemicals and application rates for each of the agrichemicals for a selected field or group of fields and/or facility or group of facilities in the form of a single agronomic prescription, which thereby allows calculation of total product requirements for each of the specified agrichemicals.

According to another aspect, the Task Module can be used remotely by the producer or a service provider on a mobile device for example a smart phone, a tablet, a laptop computer, and the like, for on-site or off-site recording of scouting observations for a selected field that can then be uploaded to the present agricultural enterprise management system as exemplified in FIGS. 1 and 2 for access by users with requisite permissions. The scouting observations input in the Task Module may be used for preparation of a task report within the Task Module that can also be uploaded to the present agricultural enterprise management system for access by users with requisite permissions. The Task Module may additionally comprise a notification function to alert other selected users with requisite permissions to the agricultural enterprise management system, that a new scouting task report has been uploaded, and optionally, to send an electronic copy of the scouting task report to one or more selected users.

A producer will be able to use the Task Module in a single integrated system to manage the complete cycle of scouting of all of the selected fields and/or facilities, to create agronomic prescriptions for each of the selected fields and/or facilities based on the scouting task reports, and to confirm that all of the agrichemical products and agronomic services specified in the agronomic prescriptions are delivered in a timely fashion as scheduled. The producer may use the Task Module to assign selected operators, field scouts, other service providers, and agricultural retailers to specific selected tasks specified in an agronomic prescription for a selected field or fields and/or facility or facilities. Furthermore, a producer may use the Task Module to monitor and confirm that the specified tasks in an agronomic prescription are delivered and/or performed on schedule and as specified. The producer may also use the Task Module to prepare historical detailed and summary reports for each crop production cycle whereby such reports are available for review, reference, and comparison in future crop cycles.

A service provider may use the Task Module for efficient collection and recording field/facility scouting information for the purposes of preparing and forwarding scouting reports to the producer (for example, by uploading scouting task reports to the present agricultural enterprise management system and/or by sending an electronic copy to the producer and other users with the requisite permissions). Likewise, the service provider may also prepare and forward an agronomic prescription for treatment of any identified crop production anomaly of crop health issues to the producer and other users with the requisite permissions. A service provider may also monitor and edit the scouting task reports for the purposes of quality control/assurance and/or data accuracy, prior to or after uploading the scouting task reports to the present agricultural enterprise management system. A service provider may also use the Task Module to notify the producer and other users with requisite permissions of prescribed products, the total volumes of prescribed products, and schedules for their applications based on the new scouting task reports to address crop production or health issues identified during a field scouting event.

Ag retailers and other product suppliers with the requisite user permissions optionally use the Task Module for product inventory control and supply management to ensure sufficient stock is on hand and delivered for application as prescribed on a timely basis.

Embodiments within the scope of the present disclosure include computer-implemented program products having machine-readable media for carrying or having machine-executable instructions or data structures stored thereon. Machine-readable media can be any available non-transitory media that can be accessed by a general purpose or special purpose computer or other machine with a processor.

Figure 4:
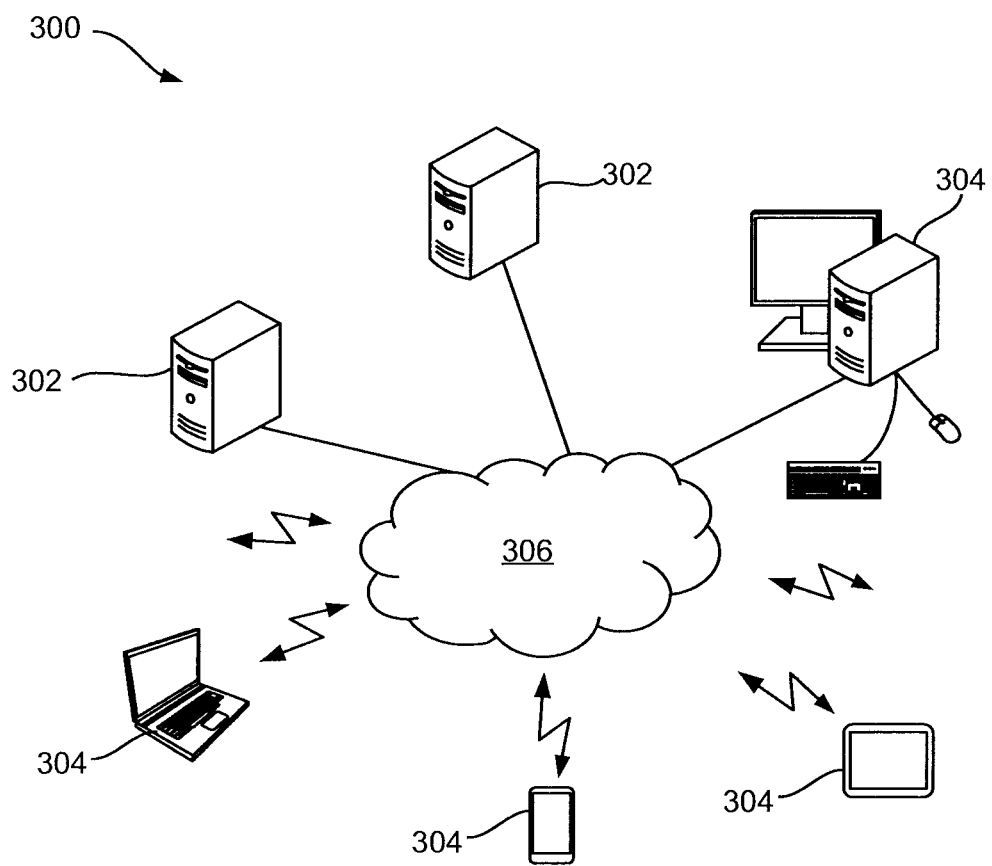
FIG. 4 is a schematic diagram showing a general structure of the system shown in FIG. 1 in the form of a computerized network system.

FIG. 4 is a schematic diagram showing a general structure of the agricultural enterprise management system 1 in the form of a computerized network system 300. The agricultural enterprise management 300 comprises one or more server computers 302. Depending on implementation, the server computer may be a server computing device, or alternatively, a general purpose computing device acting as a server computer while also being used by a user. The server computers 302 run one or more server programs.

The agricultural enterprise management 300 also comprises one or more client computing devices 304 such as desktop computers, laptop computers, tablets, smartphones, Personal Digital Assistants (PDAs) and the like. Each client computing device 304 runs one or more client application programs and for users to use. The one or more server computers 302 and the one or more client computing devices 304 are functionally interconnected by a network 306, such as the Internet, a local area network (LAN), a wide area network (WAN), or the like, via suitable wired and/or wireless networking connections.

Generally, each of the computing devices 302 and 304 is a general purpose computer or other suitable computing device comprising, for example, a processing unit, system memory (volatile and/or non-volatile memory), other non-removable or removable memory (for example, a hard disk drive, RAM, ROM, EPROM, EEPROM, CD-ROM, DVD, solid-state memory, flash memory, and/or the like), and a system bus coupling the various components to the processing unit. The computing device 302 or 304 also comprises networking capabilities using Ethernet, WI-Fi® (WI-FI is a registered trademark of Wi-Fi Alliance, Austin, Tex., USA), and/or other suitable network format, to enable connection via the network 306 to one or more shared or remote drives, one or more networked computers, or other networked devices. The computing device 302 or 304 may use a computer mouse and a keyboard for receiving user input, and may use a display or monitor for displaying a graphic user interface (GUI) to the user. Alternatively, the client computing device 304 may use a touch-sensitive display for displaying a GUI and for receiving user input.

Figure 5:
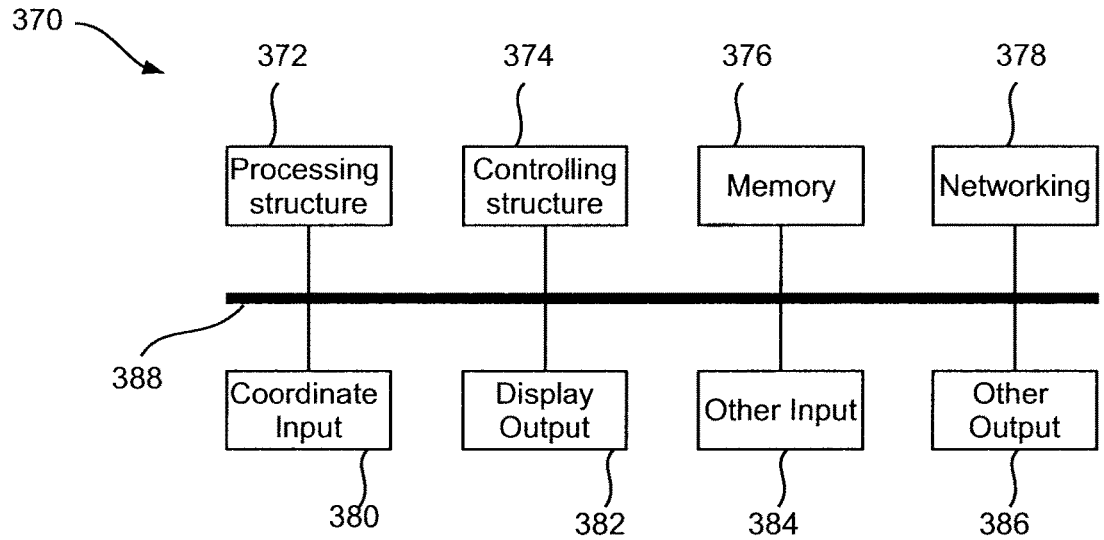
FIG. 5 shows a hardware structure of a computing device of the computerized network system shown in FIG. 4.

FIG. 5 shows a hardware structure 370 of a computing device 302/304. The computing device 302/304 comprises a processing structure 372, a controlling structure 374, memory 376 such as one or more storage devices, a networking interface 378, a coordinate input 380, a display output 382, and other input and output modules 384 and 386, all functionally interconnected by a system bus 388.

The processing structure 372 may be one or more single-core or multiple-core computing processors such as INTEL® microprocessors (INTEL is a registered trademark of Intel Corp., Santa Clara, Calif., USA), AMD® microprocessors (AMD is a registered trademark of Advanced Micro Devices Inc., Sunnyvale, Calif., USA), ARM® microprocessors (ARM is a registered trademark of Arm Ltd., Cambridge, UK) manufactured by a variety of manufactures such as Qualcomm of San Diego, Calif., USA, under the ARM® architecture, or the like.

The controlling structure 374 comprises a plurality of controllers such as graphic controllers, input/output chipsets, and the like, for coordinating operations of various hardware components and modules of the computing device 302/304.

The memory 376 comprises a plurality of memory units accessible by the processing structure 372 and the controlling structure 374 for reading and/or storing data such as input data and data generated by the processing structure 372 and/or the controlling structure 374. The memory 376 may be volatile and/or non-volatile, non-removable or removable memory such as RAM, ROM, EEPROM, solid-state memory, hard disks, CD, DVD, flash memory, and/or the like. In use, the memory 376 is generally divided to a plurality of portions for different use purposes. For example, a portion of the memory 376 (denoted herein as storage memory) may be used for long-term data storing, for example, storing files or databases. Another portion of the memory 376 may be used as the system memory for storing data during processing (denoted herein as working memory).

The networking interface 378 comprises one or more networking modules for connecting to other computing devices or networks via wired and/or wireless connections such as Ethernet, WI-FI®, BLUETOOTH®, ZIGBEE® (ZIGBEE is a registered trademark of ZigBee Alliance Corp., San Ramon, Calif., USA), 3G or 4G or 5G wireless mobile telecommunications technologies, and/or the like. In some embodiments, parallel ports, serial ports, USB connections, optical connections, or the like, may also be used for connecting other computing devices or networks although they are usually considered as input/output interfaces for connecting input/output devices.

The display output 382 comprises one or more display modules for displaying images, such as monitors, LCD displays, LED displays, projectors, and/or the like. The display output 382 may be a physically integrated part of the computing device 302/304 (for example, the display of a laptop computer or a tablet), or may be a display device physically separated from but functionally coupled to other components of the computing device 302/304 (for example, the monitor of a desktop computer).

The coordinate input 380 comprises one or more input modules for one or more users to input coordinate data. Examples of the coordinate input 380 include but are not limited to touch-sensitive screen, touch-sensitive whiteboard, trackball, computer mouse, touch-pad, other suitable human interface devices (HID), and the like. The coordinate input 380 may be a physically integrated part of the computing device 302/304 (for example, the touch-pad of a laptop computer or the touch-sensitive screen of a tablet), or may be a display device physically separated from but functionally coupled to other components of the computing device 302/304 (for example, a cordless computer mouse). The coordinate input 380 in some embodiments may be integrated with the display output 382 to form a touch-sensitive screen or touch-sensitive whiteboard.

The computing device 302/304 may also comprise other inputs 384 such as keyboards, microphones, scanners, and/or the like. The computing device 302/304 may further comprise other output 386 such as speakers, printers, and/or the like. In some embodiments, at least one client computing device 304 may also comprise a GPS component for determining the position thereof. In some alternative embodiments, at least one client computing device 304 is functionally coupled to an external GPS device for determining the position of the client computing device 304.

The system bus 388 interconnects various components 372 to 386 enabling them to transmit and receive data and control signals to/from each other.

Figure 6:
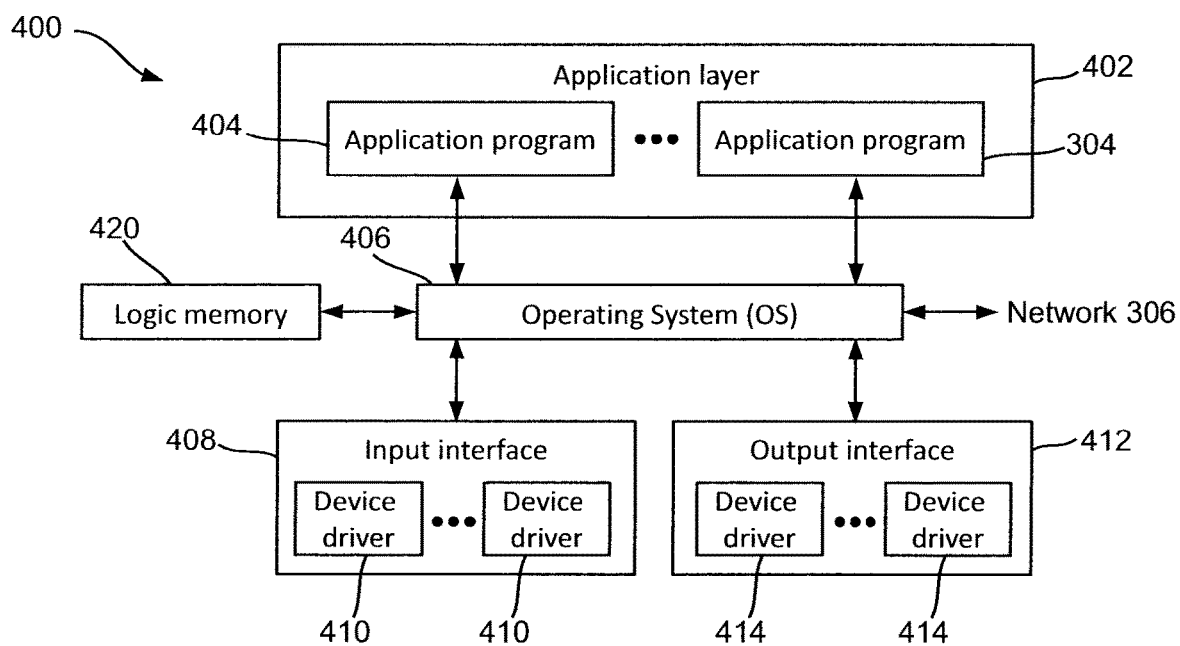
FIG. 6 shows a simplified software architecture of the computing device shown in FIG. 5.

FIG. 6 shows a simplified software architecture 400 of a computing device 302/304. The software architecture 400 comprises an application layer 402, an operating system 406, an input interface 408, an output interface 412, and a logic memory 420. The application layer 402 comprises one or more application programs 404 executed or run by the processing structure 372 for performing various jobs. The operating system 406 manages various hardware components of the computing device 302/304 via the input interface 408 and the output interface 412, manages logic memory 420, and manages and supports the application programs 404. The operating system 406 is also in communication with other computing devices (not shown) via the network 306 to allow application programs 404 to communicate with application programs running on other computing devices. As those skilled in the art will appreciate, the operating system 406 may be any suitable operating system such as Microsoft® Windows® (Microsoft and Windows are registered trademarks of Microsoft Corporation of Redmond, Wash., U.S.A.), Apple® OS X® (Apple and OS X are registered trademarks of Apple Inc. of Cupertino, Calif., U.S.A.), Apple® iOS® (iOS is a registered trademark of Cisco Systems, Inc. of San Jose, Calif., U.S.A.), Linux® (Linux is a registered trademark of Linux Foundation of San Francisco, Calif., U.S.A.), Android® (Android is a registered trademark of Google LLC of Mountain View, Calif., U.S.A.), or the like. The computing devices 302/304 of the agricultural enterprise management 300 may all have the same operating system, or may have different operating systems.

The input interface 408 comprises one or more input device interfaces 410 for communicating with respective input devices including the coordinate input 150, and the output interface 412 comprises one or more output device interfaces 414 managed by the operating system 406 for communicating with respective output devices including the display output 152. Input data received from the input devices via the input interface 408 is sent to the application layer 402, and is processed by one or more application programs 404. The output generated by the application programs 404 is sent to respective output devices via the output interface 412.

The logical memory 420 is a logical mapping of the physical memory 146 for facilitating access to the application programs 404. In this embodiment, the logical memory 420 comprises a storage memory area that is usually mapped to non-volatile physical memory, such as hard disks, solid state disks, flash drives, and the like, for generally long-term storing data therein, for example, storing the database 15 (see FIG. 1). The logical memory 420 also comprises a working memory area that is generally mapped to high-speed, and in some implementations volatile physical memory such as RAM, for application programs 404 to generally temporarily store data during program execution. For example, an application program 404 may load data from the storage memory area into the working memory area and may store data generated during its execution into the working memory area. The application program 404 may also store some data into the storage memory area as required or in response to a user's command.

In a server computer 302 or a client computing device when acting as a server 302, the application layer 402 generally comprises one or more server application programs 404 which provide server-side functions for managing network communication with client computing devices 304, and facilitating agricultural enterprise management.

In a client computing device 304, the application layer 402 generally comprises one or more client application programs 404 which provide client-side functions for communicating with the server application programs 404, displaying information and data on the GUI thereof, receiving user's instructions, and collaborating with the server application programs 404 for agricultural enterprise management.

It is important to note that the construction and arrangement of the system disclosed herein as shown in the various embodiments, is illustrative only. Certain features and embodiments have been shown and described in the present disclosure and many modifications and changes may occur to those skilled in the art, values of parameters, mounting arrangements, use of materials, orientations, and/or the like, without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Furthermore, in an effort to provide a concise description of the embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

EXAMPLES

Example 1. Selection of a Crop for Production During the Next Growing Season

Crop production planning typically commences during the winter approximately three to four months prior to spring sowing activities. Exemplary interactive steps that a producer may undertake with the agricultural enterprise management system disclosed herein include first preparing a historical report summarizing crop production on a selected field. The historical report may span 3 years (yrs), 5 yrs, 8 yrs, 10 yrs, 12 yrs, 15 yrs, 20 yrs and selected periods therebetween. The historical report may include some or all of the following parameters:
- type of crop including variety and seed treatment (if any);
- total crop yield goals and actualizations on an annual basis;
- cost of production, optionally broken out by cost of seed, cost of fertility inputs, cost of pesticide inputs, agronomic consulting and scouting costs, cost of fuel, labor costs for seeding, inputs applications, harvest, and the like;
- overhead management costs and capital depreciation;
- revenues generated from sales of each of the harvested crops and/or execution of financial positions on an annual basis; and net profits generated from each of the crops on an annual basis.

The historical report may optionally include market price data for other crop types that were not grown to enable "what if" analyses determine if an alternative crop had been produced and sold instead of the actual crop that was produced for one or more selected years in the historical report.

The present agricultural enterprise management system enables a producer to parse the historical data records that were input into his database modules during each crop production cycle for (i) agricultural production data; (ii) variable zone-based agronomic prescriptions; (iii) ag-chemical input records and costs for each annual cropping cycle; (vii) data pertaining to commodity demands, volumes delivered, and pricing; (ix) crop sales and ROI data; using (xiii) the plurality of algorithms for assimilating outputs from the above components into dashboard summaries of "key performance indicators" (KPIs); and (xiv) the farm data and service marketplace module wherein the sale, exchange, collection and connection of all farm data sets were input into, to produce the historical report. The historical data may be correlated with real-time feeds of world supply and commodity market pricing to assess the "next year" potential harvested value of each crop option. The producer would then be able to use (vii) a plurality of predictive modeling algorithms for performance of real-time "what if" analyses facilitate production management decisions to respond to global weather events and/or economic fluctuations, or to rank the ROI potential for each crop option being considered to enable a final decision on selection of a crop for production. After a crop has been selected for production, participating service providers directly involved with related work orders can be alerted on a scheduled basis to confirm delivery of selected products and services.

Example 2. Use of the Task Module by a Service Provider to Record an In-Season Crop Performance Assessment Event in a Selected Field This example is based on the premise that an agronomist under contract to a producer to perform in-season regularly scheduled scouting of a crop's growth and performance on a selected field or facility, and to detect the occurrence of any crop diseases or pests.

In reference to FIG. 3 and FIGS. 3A to 3C, the agronomist would have input their observations into a Crop Management app installed on a hand-held electronic device 210 (e.g., a tablet) thereby generating a scouting report 212 (shown as a new task in the Task Module 200). The scouting report is uploaded into the Task Module 200 component of the present agricultural enterprise management system (it is to be understood that the Crop Management app is one of the productivity apps 23 shown in FIGS. 1 and 2). Optionally, the agronomist may also send the scouting report and the scouting observations via a suitable communication means 213A such as an email, a text message, an in-app notification, and/or the like, directly to the producer and/or other users with requisite permissions from the agronomist's hand-held device. Moreover, the agronomist may use the Task Module 200 to further send schedules 213B of one or more actions to the producer and/or other users with requisite permissions to record the schedules into their calendars.

After the scouting report is uploaded into the Task Module 200, the dashboard of agricultural enterprise management system will show that the scouting task has been completed 214. In this example, crop growth and development were considered to be normal and on schedule with no evidence of disease or pests or nutrient deficiency. Accordingly, the agronomist would have entered that a new agronomic prescription or alternatively, an agronomic prescription modification was not required 215, 216 after which, the Task Module would process that the existing task (i.e., the scouting event) had been completed 217, 218 and would appear on the dashboard of the agricultural enterprise management system as a uniquely identified and verifiable completed task 219.

Example 3. Use of the Task Module by a Service Provider to Create an Agronomic Prescription from an In-Season Crop Performance Assessment Event Recorded by a Producer in a Selected Field This example is based on the premise that a producer performed an in-season scouting assessment of one of their fields/facilities and noted two issues of concern in their crop. First, the overall growth and development of the crop across the entire field/facility appeared to be lagging compared to crops grown in adjacent fields/facility. Second, the producer observed an insect pest in several isolated locations within the field/facility.

The producer would have input their observations into the Crop Management app installed on their hand-held electronic device 210 (e.g., a tablet) thereby generating a scouting report 212 that was uploaded into the present agricultural enterprise management system (shown as a new task in the Task Module 200), and the dashboard of agricultural enterprise management system will show that the scouting task has been completed 214. The producer would have elected to deliver a notification via a suitable communication means 213A such as an email, a text message, an in-app notification, and/or the like, to their service provider (e.g., an agronomist) that a scouting report had been uploaded to the present agricultural enterprise management system. The agronomist would then review 215 the scouting report input 216 and based on the report contents, determine if an agronomic prescription is required.

If it is determined that an agronomic prescription is required, the agronomist would first select the task(s) reviewed. The agronomist may optionally include additional fields and/or facilities in the prescription 221 by selecting from a menu of available fields and/or facilities, which will result in a new task being created for each of the appended fields and/or facility. Second, the agronomist would select products for inclusion in the agronomic prescription and specify (i) the increased rate of application for each pesticide, and (ii) the rate of application for the pesticide 222. Based on the acreage of all fields and/or square feet of production space within a facility included in the agronomic prescription, the total product requirements are calculated for each product included in the agronomic prescription 223. Upon saving the agronomic prescription 224, the phase of existing tasks are updated 225, and new tasks are created for any fields and/or facility that were appended to the agronomic prescription 226, with both new and existing tasks being associated the new agronomic prescription 227.

In some embodiments, upon saving the agronomic prescription 224, the Task Module 200 may determine one or more actions to be taken based on the task, and assign the one or more actions to relevant users such as one or more suppliers and/or service providers. Moreover, the Task Module 200 may schedule the one or more actions and record the scheduled one or more actions into the calendars 213B of the relevant users. The methods and system disclosed herein may further track the progress of the scheduled one or more actions for monitoring the progress of the task. Necessary notifications 213A of the task and/or the progress thereof may also be sent to the relevant users.

The next step would be the actual pesticide application event 228, which may be recorded in the Crop Management app installed on their hand-held electronic device by any user with the requisite permissions 235 (notification of select recipients optional 213A), resulting in the updating of the task associated to the application event record. Alternatively, a scheduled pesticide application event may be recorded in the agricultural enterprise management system Task Module 236 by selecting from eligible tasks (i.e. those tasks with an application event scheduled) 237. In this case, the prescribed products, rates, and fields/facilities included in the original agronomic prescription are displayed as default, allowing the producer to adjust fields/facilities, products, and rates according to actual application events 238, and then save the application record(s) 239, thereby updating all associated tasks 240 (notification of select recipients optional 213A). The schedules of the tasks 240 may also be updated and recorded in the calendars 213B of relevant users. Alternatively, an application event 246 may also be recorded in the Crop Management app outside of the regular task workflow 247, resulting in a new task being created for the associated field and/or facility (notification of select recipients optional 213A). Moreover, the Task Module 200 may also send schedules 213B of one or more actions to relevant users to record the schedules into their calendars.

In all cases, when an application event is recorded and saved, the corresponding task is updated to "Products Applied" in the Task Module 241.

The next step involves the producer reviewing all tasks that have a status of "Products Applied" in order to verify and confirm satisfactory completion 242. Tasks may be individually marked as complete in the corresponding task report, or selected as a group in the Task Module and then marked "Complete" 243, resulting in the status of all selected tasks being updated to "Complete" 244 in the Scouting Tasks Module. It should be noted that the producer may indicate completion of one or more tasks, regardless of the current and possibly varying status of selected tasks (e.g. following Scouting, Prescriptions, or Products Applied).

Although embodiments have been described above with reference to the accompanying drawings, those of skill in the art will appreciate that variations and modifications may be made without departing from the scope thereof as defined by the appended claims.

What is claimed is:

1. A computerized method for regularly monitoring growth of a selected crop, the method comprising:
    creating a first task;
    collecting and storing into one or more cloud-based databases one or more scouting observations of a first site, the one or more scouting observations comprising at least a crop growth and development assessment and/or a detection of a presence of a plant pest and/or a detection of a plant disease and/or a detection of a nutrient deficiency;
    automatically generating a scouting report based on the collected one or more scouting observations and associating the generated scouting report with the first task;
    presenting the generated scouting report to a user;
    receiving a first user input indicating at least one product for applying to the first site and a rate of application of the at least one product;
    automatically calculating total requirements of the at least one product based on a total size of a site set, said site set comprising at least the first site;
    automatically generating and storing into the one or more cloud-based databases one or more agronomic prescriptions for scheduling, delivery, and application of the at least one product in the site set and associating the generated one or more agronomic prescriptions with the first task, said one or more agronomic prescriptions comprising the rate of application of the at least one product and the calculated total requirements of the at least one product;
    receiving and scheduling one or more first application events in accordance with the one or more agronomic prescriptions, the one or more first application events comprising application data, the application data comprising at least an area that the at least one product has been applied thereto and an actual rate that the at least one product has been applied;
    tracking progress of the scheduled one or more first application events for monitoring progress of the first task;
    recording and associating with the first task the application data of the received one or more first application events;
    updating the first task based on the recorded application data; and
    determining completion of the first task based on a comparison between the one or more agronomic prescriptions and the recorded application data.

2. The computerized method of claim 1, wherein the one or more agronomic prescriptions comprise one or more schedules for applying the at least one product in the site set.

3. The computerized method of claim 1, wherein said recording and associating with the first task the application data of the received one or more first application events comprises at least one of:
    recording the application data of the received one or more first application events in a mobile app of the user and associating the recorded application data with the first task; and
    recording the application data of the received one or more first application events in the one or more cloud-based databases and associating the recorded application data with the first task.

4. The computerized method of claim 1 further comprising:
    notifying the user the completion of the first task.

5. The computerized method of claim 1 further comprising:
    receiving a second application event irrelevant to the one or more agronomic prescriptions;
    creating a second task; and
    recording the received second application event with the second task.

6. The computerized method of claim 1 further comprising at least one of:
    estimating potential yields of the selected crop based on the generated scouting report; and
    assessing whether or not an agronomic prescription should be prepared in order to improve crop growth and development.

7. The computerized method of claim 1 further comprising:
    receiving a second user input indicating a plurality of agrichemicals and application rates thereof for the site set;

automatically calculating total product requirements of each of the plurality of agrichemicals; and including the plurality of agrichemicals and the calculated total product requirements thereof into the one or more agronomic prescriptions.

8. A computer system for regularly monitoring growth of a selected crop, the computer system comprising:

a memory;

one or more cloud-based databases;

a network or a communication connection; and a processing structure coupled to the memory, the one or more cloud-based databases, and the network or the communication connection;

wherein the processing structure, the memory, the one or more cloud-based databases, and the network or the communication connection form a single computerized platform; and wherein the processing structure is configured for:

creating a first task;

collecting and storing into one or more cloud-based databases one or more scouting observations of a first site, the one or more scouting observations comprising at least a crop growth and development assessment and/or a detection of a presence of a plant pest and/or a detection of a plant disease and/or a detection of a nutrient deficiency;

automatically generating a scouting report based on the collected one or more scouting observations and associating the generated scouting report with the first task;

presenting the generated scouting report to a user;

receiving a first user input indicating at least one product for applying to the first site and a rate of application of the at least one product;

automatically calculating total requirements of the at least one product based on a total size of a site set, said site set comprising at least the first site;

automatically generating and storing into the one or more cloud-based databases one or more agronomic prescriptions for scheduling, delivery, and application of the at least one product in the site set and associating the generated one or more agronomic prescriptions with the first task, said one or more agronomic prescriptions comprising the rate of application of the at least one product and the calculated total requirements of the at least one product;

receiving and scheduling one or more first application events in accordance with the one or more agronomic prescriptions, the one or more first application events comprising application data, the application data comprising at least an area that the at least one product has been applied thereto and an actual rate that the at least one product has been applied;

tracking progress of the scheduled one or more first application events for monitoring progress of the first task;

recording and associating with the first task the application data of the received one or more first application events;

updating the first task based on the recorded application data; and determining completion of the first task based on a comparison between the one or more agronomic prescriptions and the recorded application data.

9. The computer system of claim 8, wherein said recording and associating with the first task the application data of the received one or more first application events comprises at least one of:

recording the application data of the received one or more first application events in a mobile app of the user and associating the recorded application data with the first task; and recording the application data of the received one or more first application events in the one or more cloud-based databases and associating the recorded application data with the first task.

10. The computer system of claim 8, wherein the processing structure is further configured for:

receiving a second application event irrelevant to the one or more agronomic prescriptions;

creating a second task; and recording the received second application event with the second task.

11. The computer system of claim 8, wherein the processing structure is further configured for at least one of:

estimating potential yields of the selected crop based on the generated scouting report; and assessing whether or not an agronomic prescription should be prepared in order to improve crop growth and development.

12. The computer system of claim 8, wherein the processing structure is further configured for:

receiving a second user input indicating a plurality of agrichemicals and application rates thereof for the site set;

automatically calculating total product requirements of each of the plurality of agrichemicals; and including the plurality of agrichemicals and the calculated total product requirements thereof into the one or more agronomic prescriptions.

13. A computer-readable storage device comprising computer-executable instructions for regularly monitoring growth of a selected crop, wherein the instructions, when loaded into a memory of a single computerized platform and executed, cause a processing structure to perform actions comprising:

creating a first task;

collecting and storing into one or more cloud-based databases one or more scouting observations of a first site, the one or more scouting observations comprising at least a crop growth and development assessment and/or a detection of a presence of a plant pest and/or a detection of a plant disease and/or a detection of a nutrient deficiency;

automatically generating a scouting report based on the collected one or more scouting observations and associating the generated scouting report with the first task;

presenting the generated scouting report to a user;

receiving a first user input indicating at least one product for applying to the first site and a rate of application of the at least one product;

automatically calculating total requirements of the at least one product based on a total size of a site set, said site set comprising at least the first site;

automatically generating and storing into the one or more cloud-based databases one or more agronomic prescriptions for scheduling, delivery, and application of the at least one product in the site set and associating the generated one or more agronomic prescriptions with the first task, said one or more agronomic prescriptions comprising the rate of application of the at least one product and the calculated total requirements of the at least one product;

receiving and scheduling one or more first application events in accordance with the one or more agronomic prescriptions, the one or more first application events comprising application data, the application data comprising at least an area that the at least one product has been applied thereto and an actual rate that the at least one product has been applied;

tracking progress of the scheduled one or more first application events for monitoring progress of the first task;

recording and associating with the first task the application data of the received one or more first application events;

updating the first task based on the recorded application data; and determining completion of the first task based on a comparison between the one or more agronomic prescriptions and the recorded application data.

14. The computer-readable storage device of claim 13, wherein the one or more agronomic prescriptions comprise one or more schedules for applying the at least one product in the site set.

15. The computer-readable storage device of claim 13, wherein the application data further comprises dates of applications, application rates, and weather conditions.

16. The computer-readable storage device of claim 13, wherein said recording and associating with the first task the application data of the received one or more first application events comprises at least one of:

recording the application data of the received one or more first application events in a mobile app of the user and associating the recorded application data with the first task; and recording the application data of the received one or more first application events in the one or more cloud-based databases and associating the recorded application data with the first task.

17. The computer-readable storage device of claim 13, wherein the instructions, when loaded into the memory of the single computerized platform and executed, further cause the processing structure to perform actions comprising:

notifying the user the completion of the first task.

18. The computer-readable storage device of claim 13, wherein the instructions, when loaded into the memory of the single computerized platform and executed, further cause the processing structure to perform actions comprising:

receiving a second application event irrelevant to the one or more agronomic prescriptions;

creating a second task; and recording the received second application event with the second task.

19. The computer-readable storage device of claim 13, wherein the instructions, when loaded into the memory of the single computerized platform and executed, further cause the processing structure to perform actions comprising at least one of:

estimating potential yields of the selected crop based on the generated scouting report; and assessing whether or not an agronomic prescription should be prepared in order to improve crop growth and development.

20. The computer-readable storage device of claim 13, wherein the instructions, when loaded into the memory of the single computerized platform and executed, further cause the processing structure to perform actions comprising:

receiving a second user input indicating a plurality of agrichemicals and application rates thereof for the site set;

automatically calculating total product requirements of each of the plurality of agrichemicals; and including the plurality of agrichemicals and the calculated total product requirements thereof into the one or more agronomic prescriptions.

* * * * *